United States Patent
Osaigbovo et al.

(10) Patent No.: US 11,397,595 B2
(45) Date of Patent: Jul. 26, 2022

(54) AUTOMATIC ELECTRONIC HISTORY CENTRALIZATION

(71) Applicant: International Business Machines Corporation, Armonk, NY (US)

(72) Inventors: Osakpamwan Osaigbovo, Argyle, TX (US); Julia Ruth Nash, Richardson, TX (US); Sumit Patel, Scottsdale, AZ (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/002,833

(22) Filed: Aug. 26, 2020

(65) Prior Publication Data

US 2022/0066793 A1    Mar. 3, 2022

(51) Int. Cl.
*G06F 9/451* (2018.01)
*G06F 16/9535* (2019.01)

(52) U.S. Cl.
CPC .......... *G06F 9/451* (2018.02); *G06F 16/9535* (2019.01)

(58) Field of Classification Search
CPC .............................. G06F 9/451; G06F 16/9535
See application file for complete search history.

(56) References Cited

U.S. PATENT DOCUMENTS

| | | | |
|---|---|---|---|
| 8,285,604 B1 | 10/2012 | Trandal | |
| 8,866,847 B2 | 10/2014 | Bedi | |
| 2012/0259744 A1 | 10/2012 | Ganesh | |
| 2013/0218721 A1 | 8/2013 | Borhan | |
| 2014/0100997 A1* | 4/2014 | Mayerle | G06Q 30/0276 |
| | | | 705/27.2 |
| 2014/0214566 A1 | 7/2014 | High | |
| 2017/0262826 A1 | 9/2017 | Bulut | |
| 2018/0182025 A1* | 6/2018 | Smith | G06Q 30/0623 |

FOREIGN PATENT DOCUMENTS

CN         107301522 A    10/2017

OTHER PUBLICATIONS

"Manage Your Expenses With Smart Receipts!", Printed Mar. 5, 2020, © Smart Receipts, 4 pages, <https://www.smartreceipts.co/>.
"Virtual and Augmented Reality Market is Expected to Exceed US$ 117 Billion by 2022", Published: Jul. 26, 2018, Copyright © 2020 MarketWatch, Inc., 8 pages, <https://www.marketwatch.com/press-release/virtual-and-augmented-reality-market-is-expected-to-exceed-us-117-billion-by-2022-2018-07-26>.

* cited by examiner

Primary Examiner — Andrey Belousov
(74) Attorney, Agent, or Firm — Edward J. Wixted, III

(57) ABSTRACT

Embodiments of the present invention provide a computer system, a computer program product, and a method that comprises determining user activity based on a personalized electronic history; generating a user interface that overlays on a physical object that denotes user interaction on the physical object based, at least in part, on the determined user activity and user location; and displaying the generated user interface that overlays on the physical object on the user interface on a computing device.

20 Claims, 5 Drawing Sheets

AUTOMATIC ELECTRONIC HISTORY CENTRALIZATION

FIELD OF INVENTION

The present invention relates generally to the field of commercial retail technology, and more specifically automatically transmitting commercial retail details to wearable technology.

BACKGROUND

Wearable technology are smart electronic devices that can be incorporated into clothing or worn on the body as implants or accessories. Wearable devices such as activity trackers, electronics, sensors, software, and connectivity are effectors that enable objects to exchange data (i.e., including data quality) through a connection with a manufacturer, operator, and/or other computing devices, without requiring human intervention.

Wearable technology has a variety of application that grows as the field itself expands. It appears prominently in consumer electronics with the popularization of the smartwatch and activity tracker. Wearable technology is also being incorporated into navigation systems, advanced textiles, and health care.

Modern electronic commerce typically uses the Internet for at least one part of the transaction's life cycle although it may also use other technologies. E-commerce businesses may employ providing or participating in online marketplaces, which process third-party business-to-consumer sales. Business-to-consumer is the process of selling consumer goods or services to customers through multiple channels of distribution. Shopping generally refers to the act of buying products, and this is done to obtain final goods.

SUMMARY

Embodiments of the present invention provide a computer system, a computer program product, and a method that comprises determining user activity based on a personalized electronic history; generating a user interface that overlays on a physical object that denotes user interaction on the physical object based, at least in part, on the determined user activity and user location; and displaying the generated user interface that overlays on the physical object on the user interface on a computing device.

DETAILED DESCRIPTION

Embodiments of the present invention recognize the need for an improvement to a computing device application by using an automatic and personalized electronic centralized history to assist in future activity. Embodiments of the present invention provides systems, methods, and computer program products for a solution to locate, analyze, and predict frequently used activities and future activities using augmented reality ("AR"). Currently, AR technologies enhance items in the real world through computer-generated perceptual information, and the enhancement occurs through multiple sensory modalities such as visual, auditory, and haptic. Generally, AR is used in a manner in which components of the digital world blend into a person's perspective of the real world, but improvements using AR may a solution to computing devices and assist with multiple human activities, including organization, navigation, and education. Embodiments of the present invention are an improvement to computing device that use AR by using an automatic and personalized electronic centralized history to locate, analyze, and predict future activity. Embodiments of the present invention accesses an individual's personalized electronic centralized history, determines frequently completed activities, locates a user, generates data related to the activity, and transmits this data to a computing device through AR. Embodiments of the present invention can transmit data specifically to a wearable computer device such as a pair of smart glasses or a smart watch.

Figure 1:
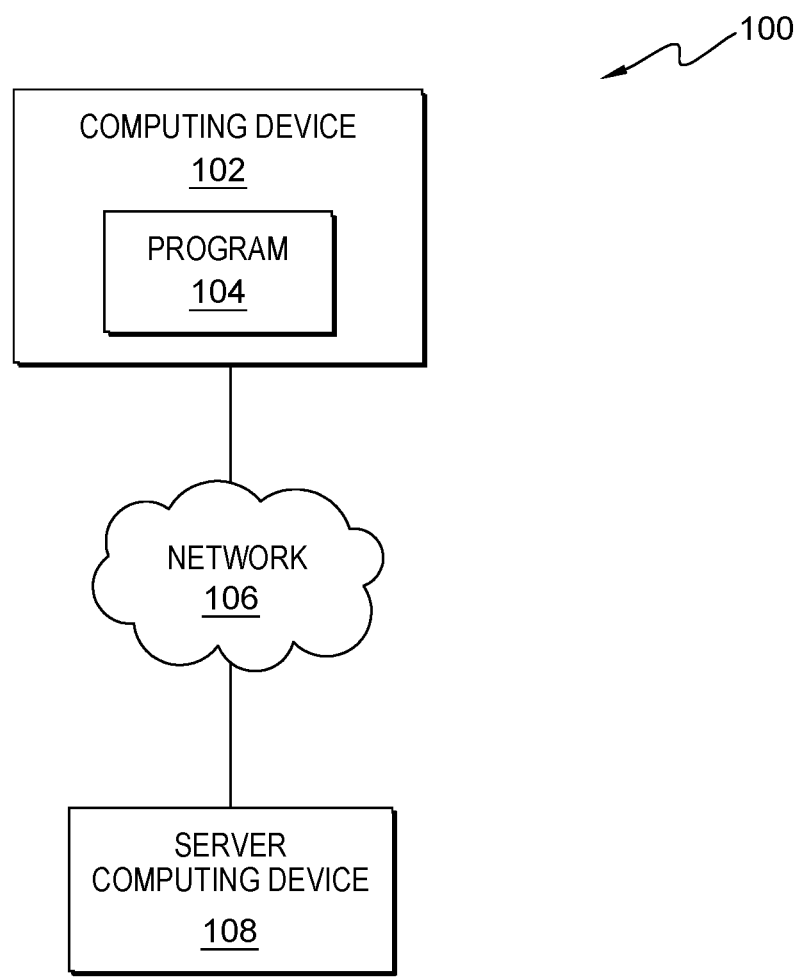
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, wearable technology, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 4. In this embodiment, the computing device 102 is capable of receiving, processing, and displaying AR images.

The computing device 102 may include a program 104. The program 104 may be a stand-alone program on the computing device 102. In another embodiment, the program 104 may be stored on a server computing device 108. In this embodiment, the program 104 accesses an individual's personalized electronic centralized history, determines user activity, locates a user, generates data in the form of an AR user interface that relates to the user activity, and displays the AR user interface on the computing device 102. In this embodiment, the program 104 generates the AR user interface using machine learning algorithms and artificial intelligence algorithms to analyze the user's personalized electronic centralized history and to predict future frequently completed activities based on the user's personalized electronic centralized history. In this embodiment, the program 104 uses near real-time tracking systems to locate the user.

In one embodiment, the program 104 generates a user interface in AR that displays details that relate to the current activity from the most recent activity in the user's personalized electronic centralized history. In this embodiment, the program 104 is a trending price AR overlay, which generates a display that shows the user trending price of frequently purchased items over their previous purchases. Trending prices are the current market rate of a particular item, and the program 104 determines trending prices by identifying the item, searching for the item using machine learning algorithms and artificial intelligence algorithms, and displays the trending prices over the previous purchased prices in AR on the computing device 102. The program 104 uses the user's previous receipts to create a record of items previous purchased and their prices. In another embodiment, the program 104 determines the length of the record of previous purchase history by receiving manual input from a user.

In another embodiment, the program 104 generates a user interface that displays, in AR, frequently completed activities and user reviews. In this embodiment, the program 104 is a customer product review personal reminder AR overly, which generates a display of a record of previously purchased items with positive or negative distinctions for each item. The program 104 designates a positive distinction a particular item by receiving manual input from the user. The program 104 designates a negative distinction a particular item by receiving manual input from the user. The program 104 generates a record from the collected manual entries from the user. In another embodiment, the program 104 accesses the user's online product reviews to generate a record. This feature allows the program 104 to notify the user that the item was previously tried and received positive distinctions. A positive distinction is defined as a pleasurable experience from the purchased item, and the user would like to purchase the item again in the future. A negative distinction is defined as unpleasurable experience from the purchased item, and the user would not like to purchase the item again in the future.

In another embodiment, the program 104 may incorporate the reviews, preferences, or manual input from another user about previously purchased items. In this embodiment, the program 104 that us a customer social history reminder would be added to the customer product review personal reminder AR overlay, which generates input from multiple users combined with the record generated for the user. In this embodiment, the program 104 differentiates between other user's recommendation with the user's record by using different color, different font, and different size of data displayed on the AR overlay. The program 104 accesses multiple user's product reviews to generate a record of multiple user's product reviews. These multiple users may be related to the user.

In this embodiment, the program 104 transmits the generated user interface to a computing device 102. The computing device 102 may be wearable technology that is able to display the AR overlay. In another embodiment, the computing device 102 may be able to display virtual reality ("VR") and AR simultaneously. In another embodiment, the program 104 receives manual input from the user to decide the form of overlay that is displayed on the computing device 102.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computing device 108, specifically the program 104 in accordance with a desired embodiment of the invention.

The server computing device 108 may include the program 104 and may communicate with the computing device 102 via the network 106. The server computing device 108 may be a single computing device, a laptop, a cloud-based collection of computing devices, a collection of servers, and other known computing devices. In this embodiment, the server computing device 108 may be in communication with the user's wearable computing device. In another embodiment, the server computing device 108 may be the user's wearable technology.

Figure 2:
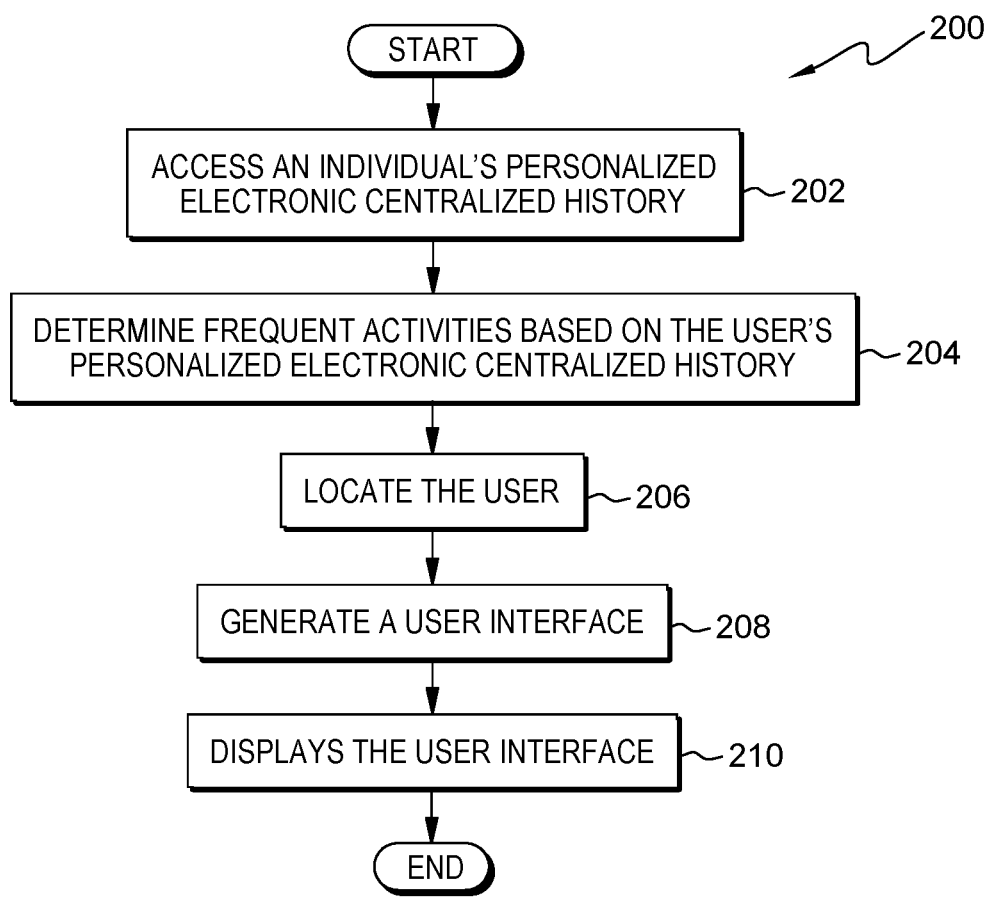
FIG. 2 is a flowchart illustrating operational steps for automatically accessing electronic purchasing history centralized database, in accordance with at least one embodiment of the present invention.

FIG. 2 is a flowchart 200 illustrating operational steps for automatically generating a personalized electronic centralized history on a computing device that displays an AR overlay.

In step 202, the program 104 accesses an individual's personalized electronic centralized history. In this embodiment, the program 104 receives opt-in/opt-out permission from a user to gain access to the user's personalized electronic centralized history. In response to giving the program 104 permission via the opt-in/opt-out function, the individual becomes a user. The program 104 accesses the user's personalized electronic centralized history when the user allows the program 104 access. In this embodiment, the program 104 already resides on the computing device 102 and remains dormant on the computing device 102 until the program 104 is granted permission to access the user's history. In this embodiment, the program 104 may access multiple user's personalized histories. For example, the program 104 accesses a user's personalized purchase history from Store A.

In step 204, the program 104 determines user activity based on the user's personalized electronic centralized history. In this embodiment, the program 104 determines a user's frequent activities by searching a user's personalized electronic centralized history, analyzing the user's personalized history, and generates a record of frequent activities. Frequent is defined as exceeding a predetermined threshold on a numerical scale, and the nature of an activity determines the predetermined threshold on the numerical scale. The numerical scale is defined as a scale from 1-10 with 10 being the most frequent, which would occur daily. For example, the activity associated with a predetermined threshold with a numerical value of 1 occurs once a year, and the activity associated with a predetermined threshold with a numerical value of 10 occurs daily. In this embodiment, the program 104 uses this predetermined threshold on the numerical scale to establish a baseline. A baseline is defined as a minimum or starting point used for comparisons. In this embodiment, the program 104 searches the user's personalized history for activities that occur more than once. Activity is defined as an action of a particular kind, and an initiated sequence of actions performed by the user. Examples of an activity are a purchase, a GPS route, and a query. In this embodiment, the program 104 uses machine learning algorithms and artificial intelligence algorithms to analyze for patterns in the user's personalized electronic centralized history to recognize the frequency of the activity by using instructions transmitted by the program 104. In another embodiment, the program 104 may determine frequent activities for multiple users. For example, the program 104 determines the user's frequent GPS direction request to Store A and the items the user frequently purchased at Store A.

In step 206, the program 104 locates the user. In this embodiment, the program 104 tracks the user's movement using a near real-time tracking system. In this embodiment, the program 104 uses the tracking system to map the location of frequent activities. The program 104 tracks the user's location by monitoring the movement of the computing device 102, while simultaneously mapping the location of the frequent activities. In another embodiment, the program 104 locates multiple users, while simultaneously mapping the location of frequent activities. For example, the program 104 locates the user near Store A, a frequent activity for the user.

In step 208, the program 104 generates a user interface in AR. In this embodiment, the program 104 generates a user interface that overlays on a physical object that denotes user interaction on the physical object based on user activity and user location. In this embodiment, the program 104 generates the user interface by analyzing the user's personalized electronic centralized history, identifies a display area, identifies an object, predicting future user activity based on the user's personalized electronic centralized history, and generating a user interface for the identified area. This step is further discussed in FIG. 3. In this embodiment, the program 104 predicts future user activity by predicting the frequency of the activity in the future, and the program 104 predicts the activity. The program 104 uses pattern recognition algorithms to predict a future activity, and the program 104 uses machine learning algorithms and artificial intelligence algorithms to predict the frequency of the activity. In another embodiment, the program 104 generates the user interface by using algorithms that perform a predetermined command. In one embodiment, the predetermined command may be a trending price algorithm, a user algorithm, and a social review algorithm. In another embodiment, the program 104 generates an AR user interface that can be a navigation screen. In that embodiment, the program 104 can be used to generate and display navigational directions using the user's frequent activities, predict a route to the frequent activities, and combines that data to establish the baseline for the AR user interface.

In step 210, displays the user interface in AR through the computing device 102. In this embodiment, the program 104 transmits and displays the generated user interface that overlays on a physical object on the user interface on the computing device 102. In this embodiment, the user interface is based on the combination of the analyzation and prediction of the user's personalized electronic centralized history. In this embodiment, the program 104 displays the generated user interface using AR overlays that allow the user to observe the user interface without distracting the user of physical barriers of the real world. In one embodiment, the program 104 displays details that relate to the current activity the user is performing as determined from frequent activity in the user's personalized electronic centralized history. In another embodiment, the program 104 displays frequent activities accompanied with their respective user review. In another embodiment, the program 104 displays multiple users' reviews, preferences, or personalized electronic centralized histories regarding frequent activities. In this embodiment, the program 104 combines the previous displays into a single display that displays data comprising the user's most recent frequent activities, the user' reviews of the frequent activities, and other user's frequent activities with their reviews. In this embodiment, the program 104 differentiates frequent activities of multiple users by using a visual notification in AR that is visible through the computing device 102. In another embodiment, the program 104 may differentiate frequent activities of multiple users using an audio notification through the computing device 102. In this embodiment, the computing device 102 is wearable technology, such as smart glasses or a smart watch.

In another embodiment, the program 104 displays navigational directions in AR to a frequent activity's location by highlighting portions of the path on the route to the location or displaying arrows in the user's field of view that direct the user. Highlighting a portion of the path is defined as the program 104 changing the color of the path (i.e., street, sidewalk, store aisle, or waterway) to the user in AR on the computing device 102. In this embodiment, the program 104 displays the arrow in front of the user in AR and at a distance that does not hinder the user's ability to observe physical barriers in the real world. For example, in response to a user's smart glasses entering a specific area of Store A, the program 104 displays navigational directions in AR to Store A by highlighting the path to provide turn by turn directions for the user.

In other embodiments, the computing device 102 is a smart card. The smart card is defined as a physical card that has an embedded integrated chip that acts as a security token. In this embodiment, the program 104 is stored on the smart card and transmits the data collected to a server computing device 108 via a network 106. For example, the smart card inserts into the computing device 102, access the user's personalized electronic centralized history, and displays the generated AR user interface.

Figure 3:
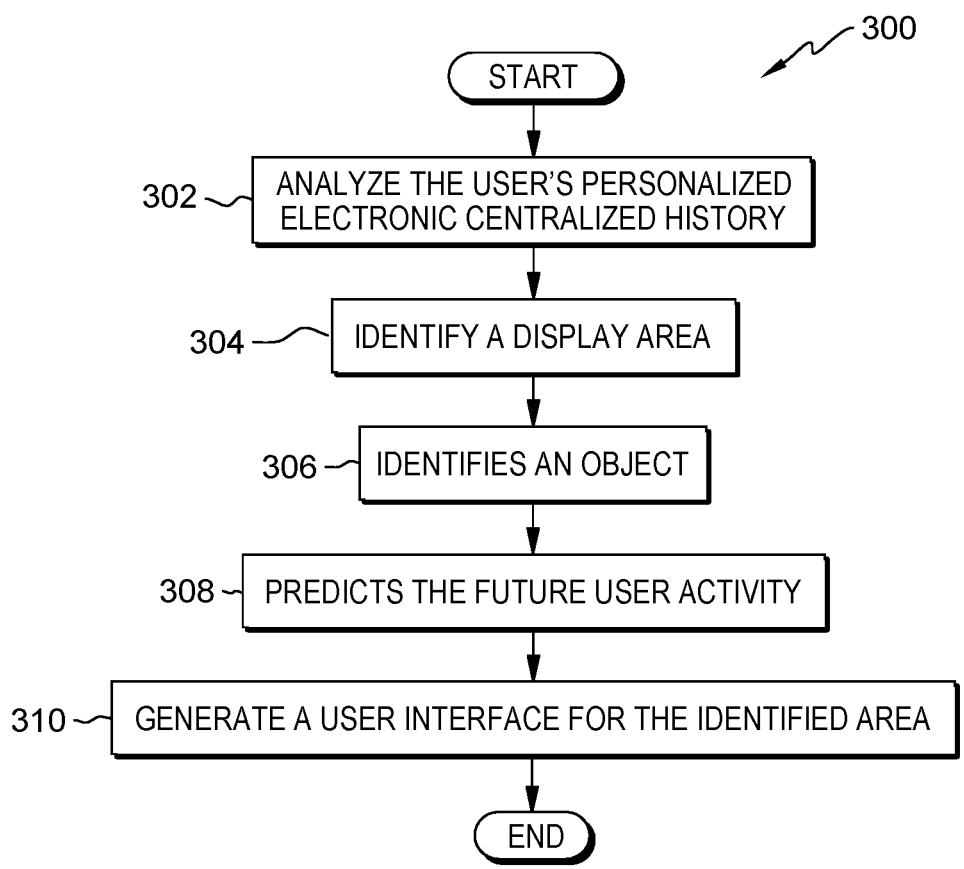
FIG. 3 is a flowchart illustrating operational steps for generating a user interface, in accordance with at least one embodiment of the present invention.

FIG. 3 is a flowchart 300 illustrating operational steps to generate a user interface on a computing device.

At step 302, the program 104 analyzes the user's personalized electronic history. In this embodiment, the program 104 analyzes the user's personalized electronic centralized history by using machine learning algorithms and artificial intelligence algorithms to determine the user's frequent activities. In another embodiment, the program 104 may use a trending price algorithm, a user object review algorithm, or a social review algorithm in combination with the machine learning algorithms and artificial intelligence algorithms to narrow the frequent activities to specific categories For example, the program 104 analyzes the prices for items that the user frequently purchases, while simultaneously analyzing reviews for the item from the user and others and places items in categories based on factors. Categories are defined as general types of activities that the program 104 analyzes within the user's personalized electronic centralized history. In another embodiment, the program 104 analyzes the user's personalized electronic centralized history by using algorithms that perform a predetermined command. In this embodiment, the predetermined command may be a trending price algorithm, a customer product review personal reminder algorithm, or a customer social history reminder algorithm.

In step 304, the program 104 identifies a display area. In this embodiment, the program 104 identifies the display area to overlay a user interface that contains the result of the analysis. In this embodiment, the program 104 identifies the display area by accessing the results of the analysis and performing a query using a blockchain algorithm and search engine algorithm to identify information about results found in the analysis. For example, the program 104 identifies the area of the bread that is commonly purchased in a store.

In step 306, the program 104 identifies an object. In this embodiment, the program 104 identifies the object that is contained in the results of the analysis. In this embodiment, the program 104 identifies the object by accessing the results of the analysis and performing a query using a blockchain algorithm and search engine algorithm to acquire details of the object. For example, the program 104 identifies the bread that is commonly purchased.

At step 308, the program 104 predicts the future user activity. In this embodiment, the program 104 predicts future frequent activities based on the user's personalized electronic centralized history by using a pattern recognition algorithm, a machine learning algorithm, and an artificial intelligence algorithm to establish a baseline based on a predetermined threshold. The program 104 accomplishes this by using the pattern recognition algorithm to predict future user activity based on the user's personalized electronic centralized history and by using the machine learning algorithm and artificial intelligence algorithm to predict the frequency of the activity based on the predetermined threshold. For example, the program 104 predicts the user purchases groceries twice a month and predicts the items the user frequently purchases every grocery trip based on analyzing the user's purchase history and predictions performed by algorithms. In another embodiment, the program 104 automatically recognizes patterns or activities in the user's personalized electronic centralized history; learns the frequency of those patterns or activities using machine learning algorithms and artificial intelligence algorithms; and predicts the future of frequent activities using pattern recognition algorithms based on the recognized activities and the learned frequency of those patterns or activities.

At step 310, the program 104 generates a user interface for the identified area. In this embodiment, the program 104 combines the analyzation of the user's personalized electronic centralized history and prediction of future user activity to generate a user interface based on the data compared to the established baseline. In this embodiment, the program 104 combines the data analyzed and predicted, and the program 104 compares that data to the established baseline for the user's frequent activities. In another embodiment, the program 104 may not have the pre-set information to establish a baseline, and the program 104 may use the data collected to establish a baseline before comparing or predicting future frequent activities. In this embodiment, the program 104 combines the data analyzed and predicted and compares that data with a trending price algorithm that details a current activity the user is performing as determined from recent and frequent activity in the user's personalized electronic centralized history. The trending price algorithm displays the trending price of frequently purchased items over their previous purchases determined in the user's personalized electronic centralized history. In this embodiment, the program 104 determines trending prices by identifying the item, searching for the item using machine learning algorithms and artificial intelligence algorithms, and displaying the trending prices over the previous purchased prices in AR on the computing device 102. In one embodiment, the program 104 uses the user's previous receipts to create a record of items previous purchased and their prices. In another embodiment, the program 104 determines the record of previous purchase history by receiving manual input from a user. In another embodiment, the program 104 stores the record of previous purchase history on the server computing device 108 via the network 106. For example, the program 104 combines the analyzation and predictions to display the prices of recently purchased items, reviews for those items, and items similar to those frequently purchased.

In another embodiment, the program 104 complies feedback from the user and use the complied feedback to generate a user interface to visually show and remind the user of feedback that the user provided as well as feedback from other users. In this embodiment, the program 104 complies feedback by using tactile algorithms to allow the user to use the sense of touch to manually input feedback through the displayed user interface. In this embodiment, the program 104 combines the data analyzed and predicted and compares that data with a customer product review personal reminder algorithm that details the user's frequent activities accompanied with their respective user review. The customer product review personal reminder algorithm displays a record of previously purchased items with positive or negative distinctions for each item. The program 104 uses a numerical scale, from 1-10, to gauge the user review of a purchased item. An item that receives a score of 6-10 receives a positive distinction, and an item that receives a score of 1-5 receives a negative distinction. The program 104 considers multiple factors when making the determination such as purchase frequency, ownership duration, and manually input reviews. In another embodiment, the program 104 may combine the use of the customer product review personal reminder algorithm with the use of the trending price algorithm. In another embodiment, the program 104 examines the user's online product reviews to determine the numerical value of an item to give a positive distinction or a negative distinction for a particular item. In another embodiment, the program 104 stores a record of positive distinctions and negative distinctions for multiple items on the server computing device 108 via the network 106.

In another embodiment, the program 104 combines the data analyzed and predicted and compares that data with a customer social history reminder algorithm that details multiple users' reviews, preferences, and personalized electronic centralized histories regarding similar frequent activities. The customer social history reminder algorithm displays personalized electronic centralized history input from multiple users combined with the user's personalized electronic centralized history. In another embodiment, the program 104 may combine the use of the customer social history reminder algorithm with the customer product review personal reminder algorithm and the trending price algorithm. In this embodiment, the program 104 uses the customer social history reminder algorithm to determine the similarities and differences between other user's reviews and recommendations and the user's personalized electronic centralized history. The customer social history reminder algorithm differentiates these differences between histories by using different colors, different fonts, and different sizes of data displayed within the user interface. In this embodiment, the program 104 accesses multiple user's product reviews to generate a record of multiple user's product reviews. In another embodiment, these multiple users may be required to be related to the user. Related is defined as sharing a commonality or common interest with the user.

Figure 4:
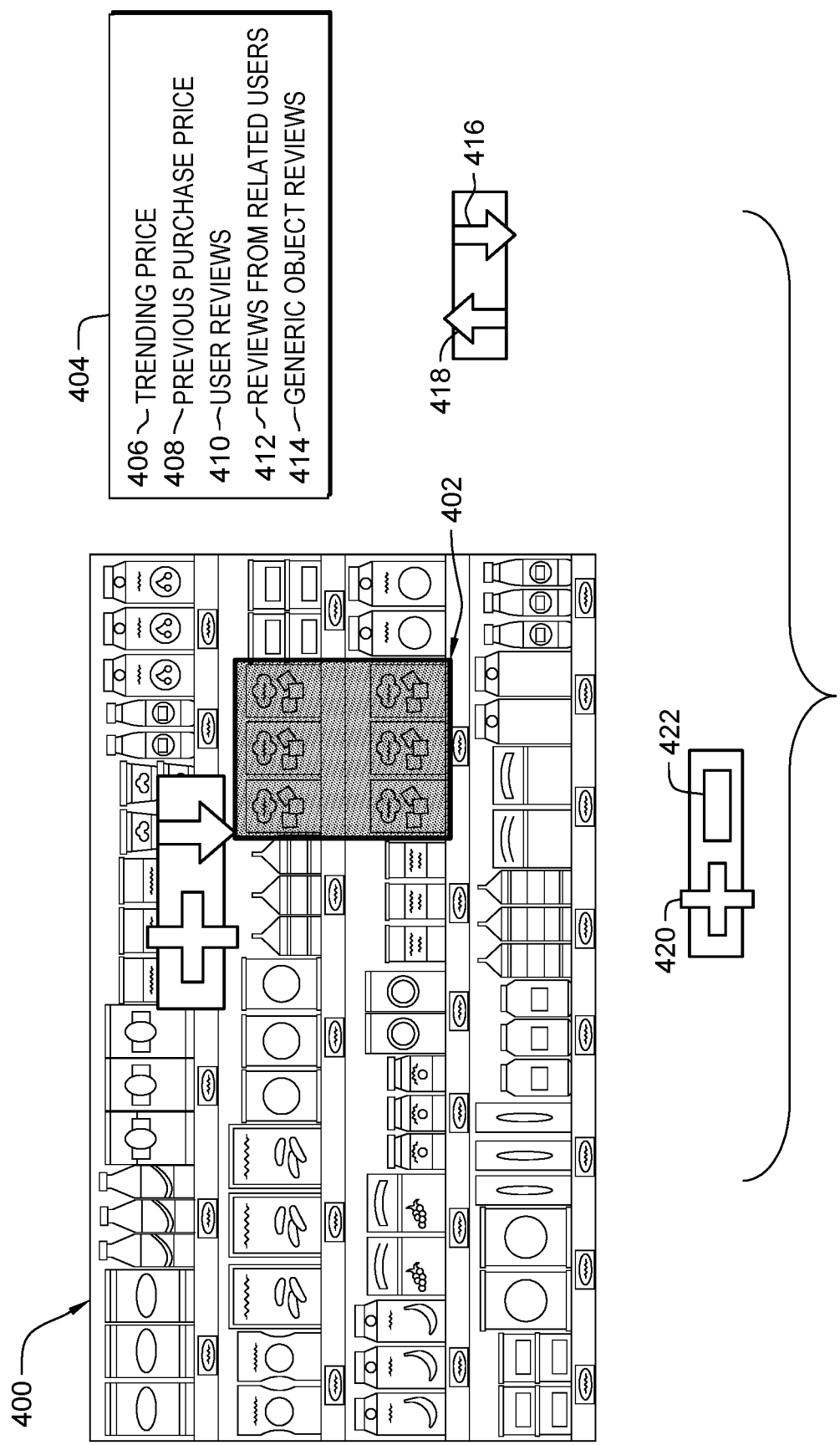
FIG. 4 depicts a block diagram of components of a generated user interface, in accordance with at least one embodiment of the present invention.

FIG. 4 depicts a block diagram of components of the generated user interface. An object 402 is displayed as highlighted or shaded within the generated user interface. A message box 404 encompasses a list of details that were the result of the analysis. Within the message box 404, the trending price 406 is displayed, previous purchase prices 408 are displayed, user reviews 410 are displayed, reviews from related users 412 are displayed, and generic object reviews 414 are displayed. In response to the trending price 406 being lower than the previous purchase prices 408, a green arrow 416 displays. In response to the trending price 406 being higher than the previous purchase prices 408, a red arrow 418 displays. In response to the user review 410 exceeding the predetermined threshold of the positive distinction, a plus sign 420 is displayed. In response to the user review 410 not exceeding the predetermined threshold of the positive distinction, a minus sign 422 is displayed.

Figure 5:
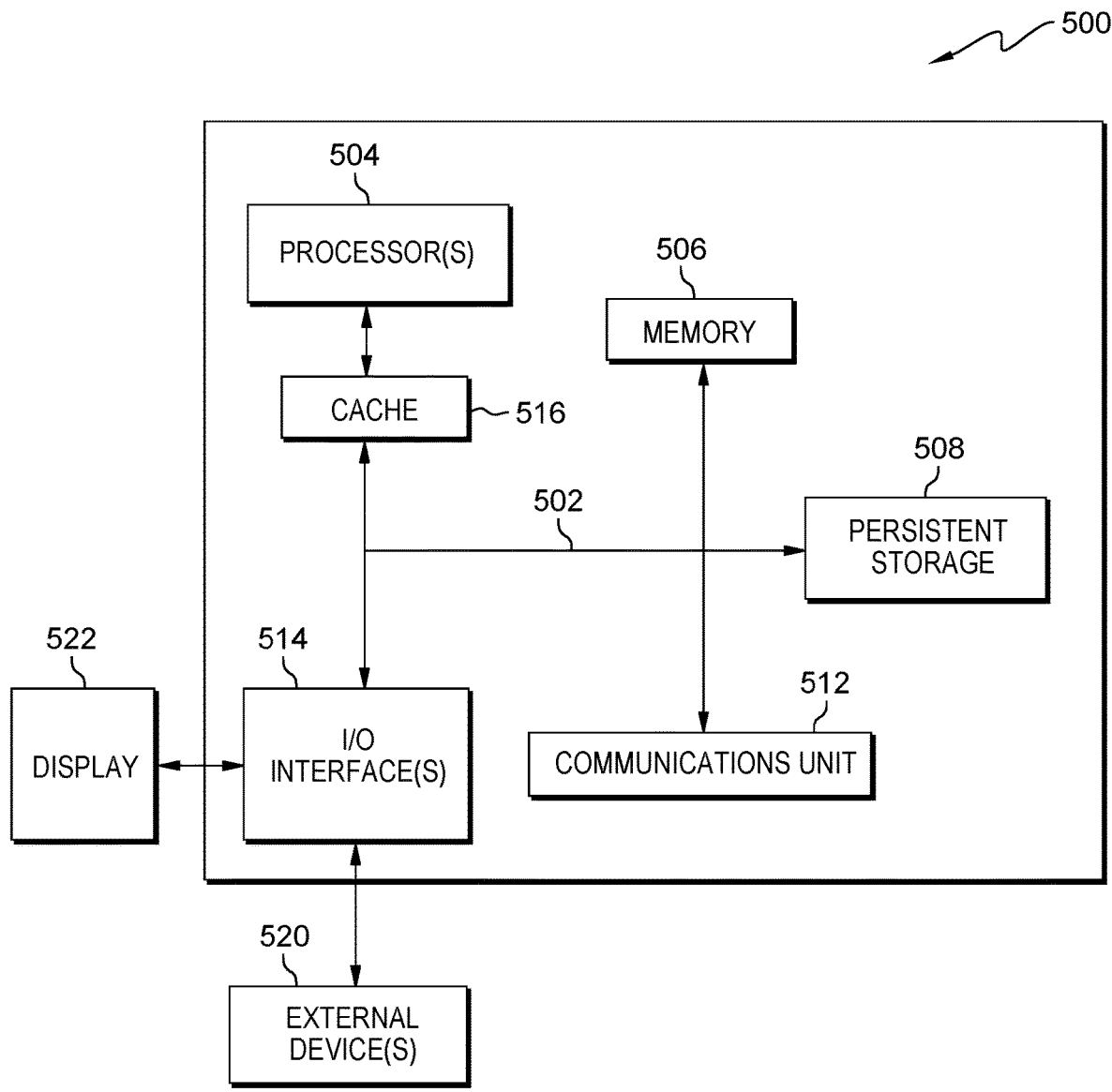
FIG. 5 depicts a block diagram of computing systems within a computing environment of FIG. 1, in accordance with an embodiment of the present invention.

FIG. 5 depicts a block diagram of components of computing systems within a computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 500 includes a communications fabric 502, which provides communications between a cache 516, a memory 506, a persistent storage 508, a communications unit 510, and an input/output (I/O) interface(s) 512. The communications fabric 502 can be implemented with any architecture designed for passing data and/or control information between processors (such as microprocessors, communications and network processors, etc.), system memory, peripheral devices, and any other hardware components within a system. For example, the communications fabric 502 can be implemented with one or more buses or a crossbar switch.

The memory 506 and the persistent storage 508 are computer readable storage media. In this embodiment, the memory 506 includes random access memory (RAM). In general, the memory 506 can include any suitable volatile or non-volatile computer readable storage media. The cache 516 is a fast memory that enhances the performance of the computer processor(s) 504 by holding recently accessed data, and data near accessed data, from the memory 506.

The program 104 may be stored in the persistent storage 508 and in the memory 506 for execution by one or more of the respective computer processors 504 via the cache 516. In an embodiment, the persistent storage 508 includes a magnetic hard disk drive. Alternatively, or in addition to a magnetic hard disk drive, the persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 508 may also be removable. For example, a removable hard drive may be used for the persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 includes one or more network interface cards. The communications unit 510 may provide communications through the use of either or both physical and wireless communications links. The program 104 may be downloaded to the persistent storage 508 through the communications unit 510.

The I/O interface(s) 512 allows for input and output of data with other devices that may be connected to a mobile device, an approval device, and/or the server computing device 108. For example, the I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 508 via the I/O interface(s) 512. The PO interface(s) 512 also connect to a display 520.

The display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

What is claimed is:

1. A computer-implemented method comprising:
   determining user activity based on a personalized electronic history;
   analyzing the personalized electronic history using a trending price algorithm and a user object review algorithm to determine a current activity corresponding to the user activity;
   generating a record of user activity based on the analyzed personalized electronic history compared to a baseline based on a predetermined threshold;
   determining trending prices and previous purchase prices based on the record;
   analyzing the personalized electronic history to identify a result comprising an object corresponding to a physical object;
   identifying a display area comprising the physical object;
   generating a user interface that overlays on the physical object that denotes user interaction on the physical object based, at least in part, on the determined user activity and user location;
   displaying a generated user interface that overlays on the physical object on the user interface on a computing device; and
   displaying the trending prices over previous purchase prices on the generated user interface.

2. The computer-implemented method of claim 1, wherein determining user activity based on the personalized electronic history comprises:
   searching the personalized electronic history;
   identifying the item corresponding to the object; and
   searching for the item corresponding to the current activity, wherein the record of user activity corresponds to a record of items previously purchased and the items corresponding prices.

3. The computer-implemented method of claim 1, wherein determining user activity based on the personalized electronic history comprises establishing a baseline based on a predetermined threshold.

4. The computer-implemented method of claim 1, wherein determining user activity based on the personalized electronic history comprises determining multiple users' frequent activities based on multiple personalized electronic histories.

5. The computer-implemented method of claim 1, further comprising locating a user comprises tracking the user using a near real-time tracking system.

6. The computer-implemented method of claim 1, wherein generating the user interface comprises:
   predicting future user activity by using pattern learning algorithms and artificial intelligence algorithms based on an established baseline; and
   generating a user interface for the identified display area.

7. The computer-implemented method of claim 1, wherein generating the user interface comprises comparing data to an established baseline.

8. The computer-implemented method of claim 1, wherein displaying the user interface on the computing device comprises displaying an augmented reality user interface.

9. The computer-implemented method of claim 1, wherein displaying the user interface comprises requesting user feedback through the displayed user interface using tactile algorithms.

10. A computer program product comprising:
    one or more computer readable storage media and program instructions stored on the one or more computer readable storage media, the program instructions comprising:
    program instructions to determine user activity based on a personalized electronic history;
    program instructions to analyze the personalized electronic history using a trending price algorithm and a user object review algorithm to determine a current activity corresponding to the user activity;
    program instructions to generate a record of user activity based on the analyzed personalized electronic history compared to a baseline based on a predetermined threshold;
    program instructions to determine trending prices and previous purchase prices based on the record; and
    program instructions to analyze the personalized electronic history to identify a result comprising an object corresponding to a physical object;
    program instructions to identify a display area comprising the physical object;
    program instructions to generate a user interface that overlays on the physical object that denotes user interaction on the physical object based, at least in part, on a determined user activity and user location;
    program instructions to display a generated user interface that overlays on the physical object on the user interface on a computing device; and
    program instructions to display the trending prices over previous purchase prices on the generated user interface.

11. The computer program product of claim 10, wherein the program instructions to determine user activity based on the personalized electronic history comprise:
    program instructions to search the personalized electronic history;
    program instructions to identify the item corresponding to the object;
    program instructions to search for the item corresponding to the current activity, wherein the record of user activity corresponds to a record of items previously purchased and the items corresponding prices.

12. The computer program product of claim 10, wherein the program instructions to determine user activity based on the personalized electronic history comprise program instructions to establish a baseline based on a predetermined threshold.

13. The computer program product of claim 10, wherein the program instructions to determine user activity based on the personalized electronic history comprise program instructions to determine multiple users' frequent activities based on multiple personalized electronic histories.

14. The computer program product of claim 10, wherein the program instructions stored on the one or more computer readable storage media further comprise:
    program instructions to locate a user comprises tracking the user using a near real-time tracking system.

15. The computer program product of claim 10, wherein the program instructions to generate the user interface comprise:
    program instructions to predict future user activity by using pattern learning algorithms and artificial intelligence algorithms based on an established baseline; and
    program instructions to generate a user interface for the identified display area.

16. The computer program product of claim 10, wherein the program instructions to generate the user interface comprise program instructions to compare data to an established baseline.

17. A computer system comprising:
    one or more computer processors;
    one or more computer readable storage media; and
    program instructions stored on the one or more computer readable storage media for execution by at least one of the one or more processors, the program instructions comprising:
        program instructions to determine user activity based on a personalized electronic history;
        program instructions to analyze the personalized electronic history using a trending price algorithm and a user object review algorithm to determine a current activity corresponding to the user activity;
        program instructions to generate a record of user activity based on the analyzed personalized electronic history compared to a baseline based on a predetermined threshold;
        program instructions to determine trending prices and previous purchase prices based on the record; and
        program instructions to analyze the personalized electronic history to identify a result comprising an object corresponding to a physical object;
        program instructions to identify a display area comprising the physical object;
        program instructions to generate a user interface that overlays on the physical object that denotes user interaction on the physical object based, at least in part, on the determined user activity and user location;
        program instructions to display a generated user interface that overlays on the physical object on the user interface on a computing device; and
        program instructions to display the trending prices over previous purchase prices on the generated user interface.

18. The computer system of claim 17, wherein the program instructions to determine user activity based on the personalized electronic history comprise:
    program instructions to search the personalized electronic history;
    program instructions to identify the item corresponding to the object;
    program instructions to search for the item corresponding to the current activity, wherein the record of user activity corresponds to a record of items previously purchased and the corresponding prices.

19. The computer system of claim 17, wherein the program instructions to generate the user interface comprise:
    program instructions to predict future user activity by using pattern learning algorithms and artificial intelligence algorithms based on an established baseline; and
    program instructions to generate a user interface for the identified display area.

20. The computer system of claim 17, wherein the program instructions to determine user activity based on the personalized electronic history comprise program instructions to establish a baseline based on a predetermined threshold.

\* \* \* \* \*